No. 677,133. Patented June 25, 1901.
R. W. HILLIKER.
BAKE OVEN FOR GAS OR GASOLENE STOVES.
(Application filed Oct. 4, 1900.)
(No Model.)

Witnesses

Inventor
R. W. Hilliker
By H. B. Willson & Co
Attorneys

UNITED STATES PATENT OFFICE.

RYERSON W. HILLIKER, OF KANSAS CITY, KANSAS.

BAKE-OVEN FOR GAS OR GASOLENE STOVES.

SPECIFICATION forming part of Letters Patent No. 677,133, dated June 25, 1901.

Application filed October 4, 1900. Serial No. 31,981. (No model.)

*To all whom it may concern:*

Be it known that I, RYERSON W. HILLIKER, a citizen of the United States, residing at Kansas City, in the county of Wyandotte and State of Kansas, have invented certain new and useful Improvements in Bake-Ovens for Gas or Gasolene Stoves; and I do declare the following to be a full, clear, and exact description of the invention, such as will enable others skilled in the art to which it appertains to make and use the same.

The invention relates to bake-ovens for gas or gasolene stoves; and it has for its object to improve the construction shown in Letters Patent No. 654,539, granted to me July 24, 1900, by providing the hood with means for more effectually retaining the heat therein, whereby articles placed upon the shelf inclosed within said hood may be more thoroughly cooked and browned.

With this and other objects in view the invention consists in certain novel features of construction and combination of parts, which will be hereinafter more fully set forth.

Figure 1:
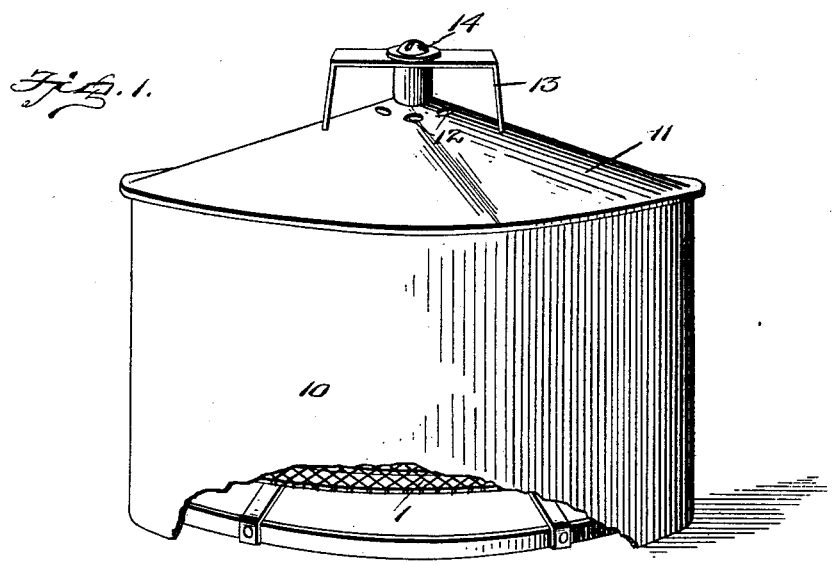
Figure 2:
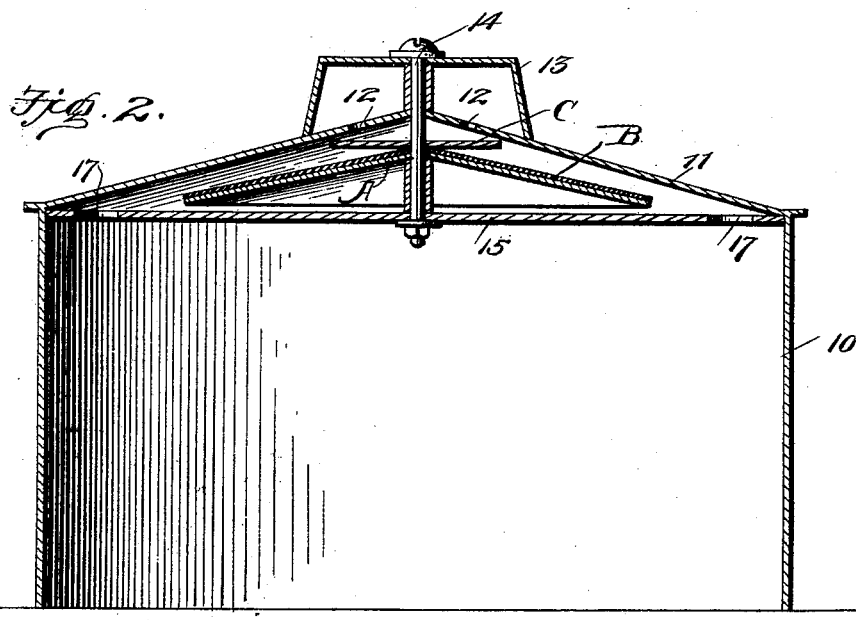

In the accompanying drawings, Figure 1 is a perspective view of my improved oven with a portion of the hood broken away to show the base or shelf of the oven, and Fig. 2 is a vertical sectional view through the oven.

Referring to the drawings, 1 denotes the shelf or supporting base upon which the articles to be cooked are adapted to be placed.

10 denotes the hood or oven proper, formed with a dome-shaped top 11, having a series of heat-outlet orifices 12 and a handle 13, which handle is secured in place by a bolt 14 passing through the handle, dome-shaped top, and diaphragm 15. Supported between the diaphragm 15 and the dome-shaped top is a dome-shaped disk A, backed with a sheet of asbestos B, riveted or otherwise secured thereto, and above the sheet of asbestos is a heat-reflecting plate C, which is arranged immediately below the ventilating-orifices 12, formed in the top of the oven, and has its edge extending laterally beyond the openings 12 and free from contact with the dome-shaped top 13 for the escape of heat through said openings. An annular row of holes 17 is also formed in the diaphragm and permits the heat and products of combustion to escape therethrough against the dome-shaped plate A, which being backed with a sheet of asbestos will retain the heat and deflect it downward, thus more thoroughly heating the interior of the oven.

The bolt 14, which passes through the handle 13, the dome-shaped top, and the diaphragm 15, is provided with two spacing-sleeves similar to those shown in my patent above referred to.

From the foregoing description, taken in connection with the accompanying drawings, the construction, operation, and advantages of my invention will be readily understood without requiring an extended explanation. By the provision of the dome-shaped plate backed with an asbestos sheet the oven may be heated to a higher degree, as the asbestos sheet serves to prevent the radiation of heat from the said plate, thus enabling me to cook articles of food more quickly and thoroughly.

Having thus fully described my invention, what I claim, and desire to secure by Letters Patent, is—

A bake-oven for gas or gasolene stoves, comprising a hood having a dome-shaped top formed with apertures, a diaphragm secured to said hood leaving an intervening space between the two, a plate secured between the hood and diaphragm and separated from each, and provided with a non-conducting sheet of material, and a second plate secured above the first-named plate immediately below the openings in the dome-shaped top and having its edges extending laterally beyond the openings in said dome-shaped top, substantially as set forth.

In testimony whereof I have hereunto set my hand in presence of two subscribing witnesses.

RYERSON W. HILLIKER.

Witnesses:
  JAS. SAMMIS,
  HENRY UDELL.